(12) United States Patent
Suh et al.

(10) Patent No.: US 9,071,018 B2
(45) Date of Patent: Jun. 30, 2015

(54) REMOVABLE MEDIA WITH LATCH (71) Applicants: Sang Moon Suh, Seoul (KR); Kyu Bae Lee, Seoul (KR)

(72) Inventors: Sang Moon Suh, Seoul (KR); Kyu Bae Lee, Seoul (KR)

(*) Notice: Subject to any disclaimer, the term of this patent is extended or adjusted under 35 U.S.C. 154(b) by 37 days.

(21) Appl. No.: 14/077,088

(22) Filed: Nov. 11, 2013

(65) Prior Publication Data

US 2015/0132980 A1    May 14, 2015

(51) Int. Cl.
H01R 13/00      (2006.01)
H01R 13/629     (2006.01)
H01R 13/52      (2006.01)
H01R 12/50      (2011.01)
H01R 13/633     (2006.01)

(52) U.S. Cl.
CPC .......... H01R 13/62905 (2013.01); H01R 13/52 (2013.01); H01R 23/7005 (2013.01); H01R 13/62933 (2013.01); H01R 13/6335 (2013.01)

(58) Field of Classification Search
CPC ................... H01R 13/62955; H01R 13/62933; H01R 13/62905; H01R 23/7005
USPC ............... 439/157, 160, 483, 484; 312/332.1, 312/223.1, 223.2
See application file for complete search history.

(56) References Cited

U.S. PATENT DOCUMENTS

| | | | |
|---|---|---|---|
| 2,853,690 A * | 9/1958 | Madison ....................... 439/155 |
| 4,887,188 A | 12/1989 | Yoshida et al. |
| 5,375,037 A | 12/1994 | Le Roux |
| 5,446,622 A * | 8/1995 | Landry et al. ................. 361/737 |
| 5,466,058 A * | 11/1995 | Chan ............................. 312/111 |
| 5,500,518 A | 3/1996 | Olzak et al. |
| 5,588,850 A | 12/1996 | Pan et al. |
| 5,879,173 A * | 3/1999 | Poplawski et al. ............. 439/138 |
| 5,947,572 A * | 9/1999 | Chang ........................ 312/332.1 |
| 5,949,652 A * | 9/1999 | McAnally et al. ............. 361/726 |
| 6,091,605 A | 7/2000 | Ramey et al. |
| 6,149,450 A | 11/2000 | Gastineau |
| 6,231,145 B1 * | 5/2001 | Liu ............................. 312/332.1 |
| 6,250,553 B1 * | 6/2001 | Beseth et al. ................. 235/487 |
| 6,282,097 B1 * | 8/2001 | Minelli et al. ................. 361/728 |
| 6,341,693 B2 | 1/2002 | Konno et al. |
| 6,471,131 B2 | 10/2002 | Okada et al. |
| 6,669,497 B2 * | 12/2003 | Westphall et al. ............ 439/325 |
| 6,981,886 B1 | 1/2006 | Co et al. |
| 7,025,637 B1 | 4/2006 | Lee |
| 7,040,911 B1 * | 5/2006 | Ho et al. ...................... 439/352 |
| 7,044,757 B1 | 5/2006 | Yen |
| 7,048,588 B2 | 5/2006 | Chang |
| 7,101,222 B2 | 9/2006 | Ho et al. |
| 7,108,553 B2 | 9/2006 | Zhu et al. |
| 7,110,250 B2 * | 9/2006 | Lee ........................... 361/679.32 |
| 7,179,129 B1 | 2/2007 | Hwang |

(Continued)

FOREIGN PATENT DOCUMENTS

WO  PCT-US1990-003236    12/1990

Primary Examiner — Neil Abrams
Assistant Examiner — Travis Chambers
(74) Attorney, Agent, or Firm — Minder Law Group; Willy H. Wong (57) ABSTRACT A removable case is provided with a latch that allows users to remove the case from a memory card slot or peripheral interface slot of an electronic device. The removable case can be used to enclose removable media or peripheral devices, such as wireless network interface controllers. When inserted into the memory card slot or peripheral interface slot, the removable case is designed to sit flush with the surface the electronic device.

8 Claims, 8 Drawing Sheets (56) References Cited

U.S. PATENT DOCUMENTS

| | | |
|---|---|---|
| 7,238,034 B2 | 7/2007 | Matsukawa et al. |
| 7,249,975 B1 | 7/2007 | Liu |
| 7,306,160 B2 | 12/2007 | Takiar et al. |
| 7,310,692 B2 | 12/2007 | Miller et al. |
| 7,324,347 B2 | 1/2008 | Nakanishi et al. |
| 7,344,072 B2 | 3/2008 | Gonzalez et al. |
| 7,410,376 B2 | 8/2008 | Ying et al. |
| 7,416,132 B2 | 8/2008 | Takiar et al. |
| 7,425,157 B1 | 9/2008 | Hung |
| 7,427,032 B2 | 9/2008 | Osako et al. |
| 7,491,076 B2 | 2/2009 | Gu et al. |
| 7,554,813 B2 | 6/2009 | Miller et al. |
| 7,615,855 B2 | 11/2009 | Osako et al. |
| 7,710,736 B2 | 5/2010 | Middlekauff et al. |
| 7,806,324 B1 | 10/2010 | Chhor et al. |
| 7,823,790 B1 | 11/2010 | Valenzuela et al. |
| 7,864,522 B1 * | 1/2011 | Peng et al. ............... 361/679.33 |
| RE42,410 E | 5/2011 | Yamada et al. |
| 8,045,326 B1 * | 10/2011 | Reznikov ................. 361/679.38 |
| 8,087,739 B2 * | 1/2012 | Chen ........................ 312/332.1 |
| 8,092,257 B2 * | 1/2012 | Hubert et al. ................. 439/638 |
| 8,102,658 B2 | 1/2012 | Hiew et al. |
| 8,110,434 B2 | 2/2012 | Okada et al. |
| 8,215,991 B2 | 7/2012 | Bryant-Rich |
| 8,246,129 B2 * | 8/2012 | Wang et al. ................ 312/332.1 |
| 8,303,322 B1 | 11/2012 | Little et al. |
| 8,359,418 B2 | 1/2013 | Bryant-Rich |
| 8,414,333 B2 | 4/2013 | Bryant-Rich |
| 2004/0242040 A1 | 12/2004 | Miyazawa et al. |
| 2005/0230483 A1 | 10/2005 | Miller et al. |
| 2005/0245120 A1 | 11/2005 | Yin |
| 2006/0057879 A1 | 3/2006 | DeLuga et al. |
| 2012/0058678 A1 | 3/2012 | Wenngren |

* cited by examiner

REMOVABLE MEDIA WITH LATCH

BACKGROUND OF THE INVENTION

1. Field of Invention

The present invention relates to a removable case that can be used, for example, to receive removable media or to enclose wireless network interface controllers.

2. Related Art

Form factor peripheral interfaces are commonly used in computers for memory cards, as well as a wide variety of other applications and devices, including network cards and modems. These memory cards are designed primarily for use in portable electronic devices, such as laptop computers, digital cameras, mobile phones, MP3 players, and video game consoles. In order to facilitate the transfer of data from these memory cards, the memory cards are designed to be removable from and insertable back into an appropriate memory card slot or peripheral interface slot within the portable electronic device.

In some electronic devices, the memory card can only be partially inserted into the memory card slot or peripheral interface slot. This leaves a portion of the memory card sticking out of the memory card slot, thereby allowing a user to remove the memory card by pulling the card out via the exposed portion. However, such exposure makes the memory card prone to accidental breakage and inadvertent ejection, as well as leaving the memory card open to contamination from dust and other elements.

Some electronic devices try to resolve these issues by inserting the memory cards completely into the slot, or otherwise enclosing the memory cards using a protective cover. As such, the portable electronic devices must provide an ejection mechanism to eject an inserted memory card from the slot in order for the memory card to be removed.

However, should the ejection mechanism fail, the inserted memory card or peripheral interface card would not be removable from the slot without the use of a tool. Accordingly, there is a need for an alternative card removal mechanism that does not interfere with the functions of the portable electronic device, the memory card, or the peripheral interface card.

In recent years, technological advancement in the memory card industry has resulted in rapid miniaturization of memory cards, resulting in a number of different memory card formats, such as CompactFlash, Memory Stick, Secure Digital (SD), and microSD. For example, microSD cards are smaller in size and generally have higher memory capacities than its predecessor SD card format. In addition, there are also differences between microSD cards and SD cards in the arrangements of their contact terminals. Due to these differences, compatibility between different formats is problematic. In response to this compatibility issue, the industry created adapters to enable the use of newer memory cards and peripheral interface cards with older peripheral interfaces. One such memory card adapter is described in U.S. Pat. No. RE42,410.

Most memory card adapters are similar to the one depicted in U.S. Pat. No. RE42,410, where the smaller memory card (for example, a miniSD card) is inserted into the memory card adapter (for example, a miniSD/SD card adapter) with the miniSD card's contact terminals aligned toward the front of the adapter. The adapter's internal and external contact terminals are also located at the front portion of the adapter. The adapter can then be inserted, front portion first, into the appropriate device (for example, an SD card reader). However, this arrangement poses several problems.

First, unless the electronic device has a protective cover enclosing the memory card adapter, the memory card can potentially slip out of the memory card adapter since there are no structures holding the back edge of the memory card in place. Second, even if the memory card does not slide out entirely, a slight change in the position of the memory card will create a card read error. If this occurs during data transfer, it can result in memory card failure or data corruption. Third, unprotected memory cards are exposed to the elements, which can lead to loss of data or premature memory card failure. Therefore, there is a need for a memory card adapter that provides a protective cover for a memory card and secures the memory card in place.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

SUMMARY OF THE INVENTION

It is an object of the invention to overcome the disadvantages of the prior art discussed above.

It is another object of the invention to provide a removable case that can be removed from a card slot without the use of tools or other mechanisms.

It is another object of the invention to provide a removable case that can sit flush along the outer surface of a peripheral interface device.

It is another object of the invention to provide a removable case that is adaptable to multiple types of memory card formats and peripheral interface standards.

It is another object of the invention to provide a memory card adapter that protects a memory card from dust and other contaminants.

It is another object of the invention to provide a memory card adapter that secures a memory card in place.

It is another object of the invention to provide a simple, efficient, durable, cost effective, and removable case for memory cards and peripheral interface devices.

To address the aforementioned objectives and other objectives that will become apparent from the description of the invention, the present invention provides a removable case with a latch. The removable case can be utilized in a variety of applications, including memory card adapters, wireless network interface controllers, or radio or television tuner cards.

DETAILED DESCRIPTION OF THE INVENTION

Referring to the drawings, a description will be made with regards to preferred embodiments of a removable case according to the present invention.

Figure 1:
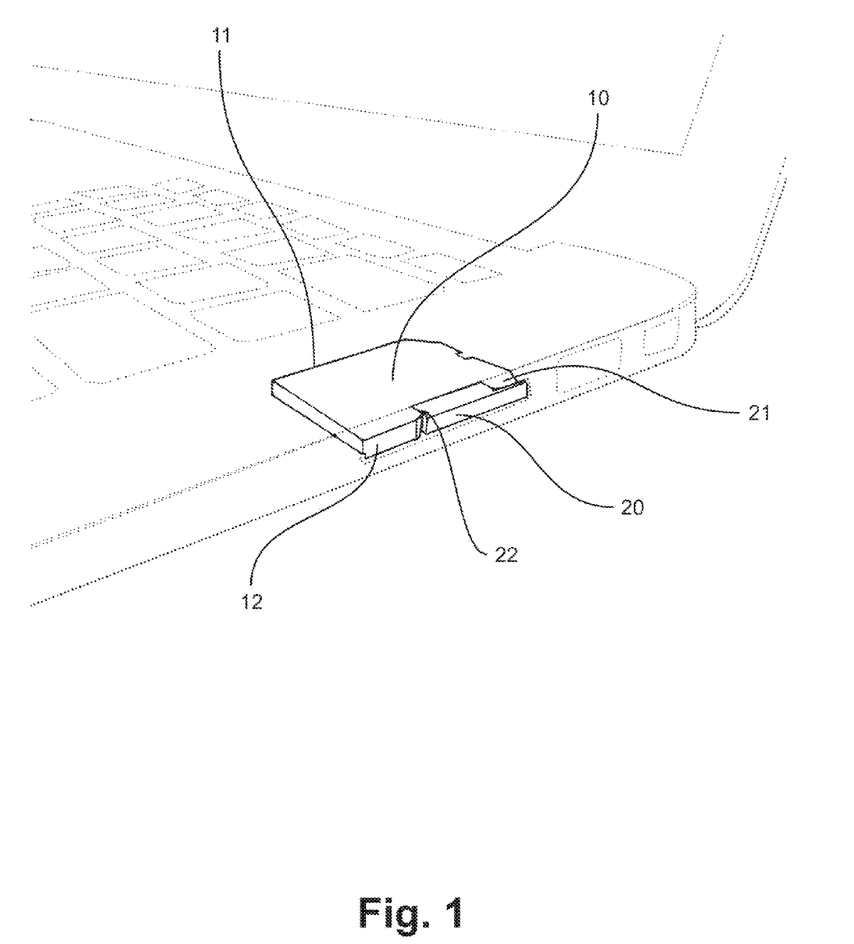
FIG. 1 is a perspective view illustrating a preferred embodiment of the present invention inserted into a memory card reader.

FIG. 1 shows one preferred embodiment of the present invention. A housing 10 of a memory card has a front side 11 and a back side 12. The memory card is capable of being inserted into a memory card reader for use in laptop computers, digital cameras, or other electronic devices. In conventional memory card readers, the memory card is inserted with the front side 11 first into the reader. As shown in FIG. 1, when the memory card is fully inserted into the reader, the back side 12 is flush with an external side of the electronic device.

Figure 2:
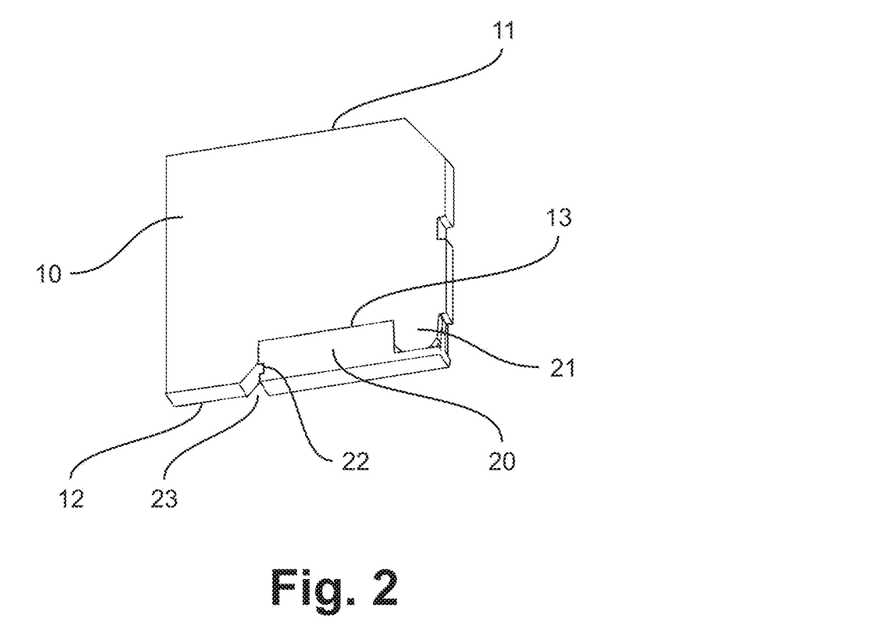
FIG. 2 is a perspective view illustrating a preferred embodiment of the present invention with the latch in a closed position.
Figure 3:
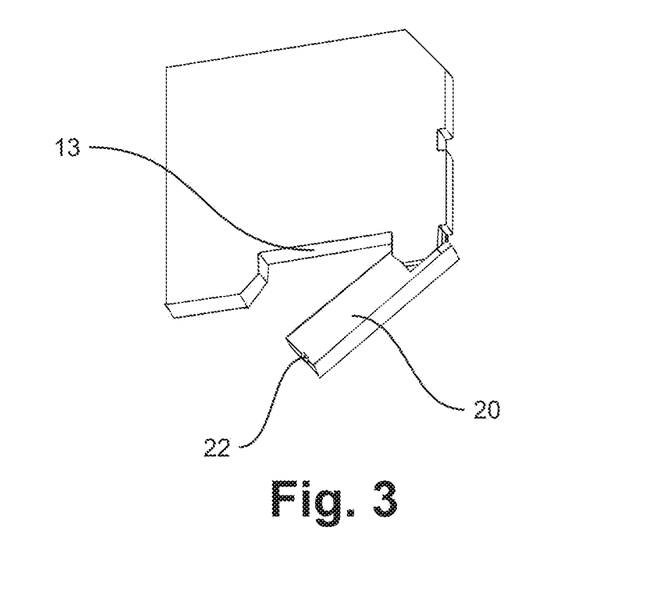
FIG. 3 is a perspective view illustrating a preferred embodiment of the present invention with the latch in an open position.
Figure 4:
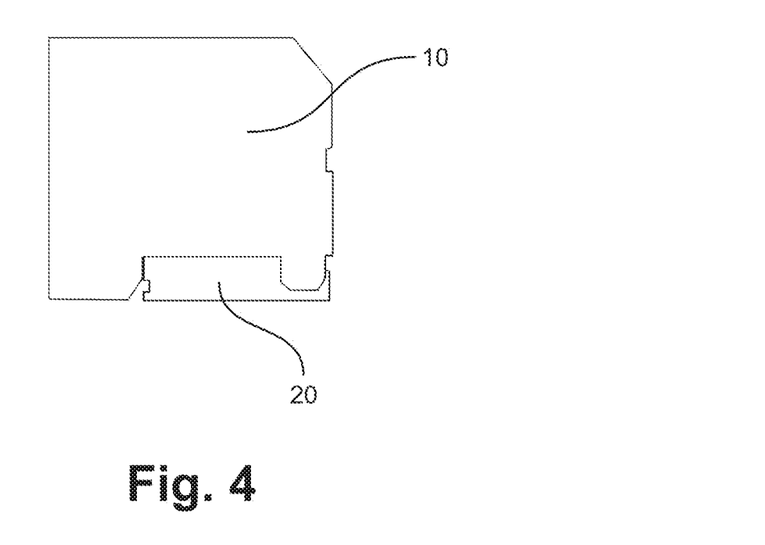
FIG. 4 is a top view illustrating a preferred embodiment of the present invention.
Figure 5:
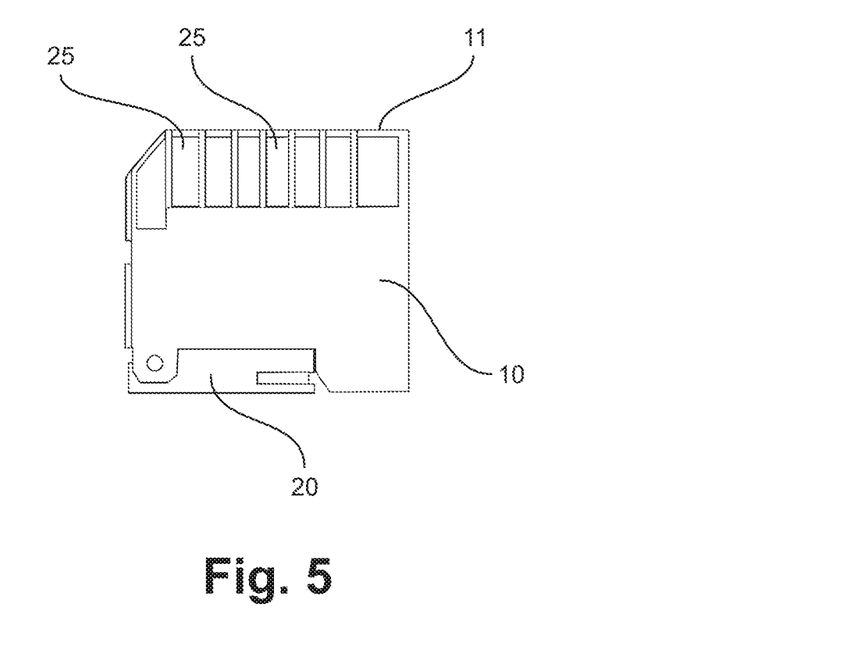
FIG. 5 is a bottom view illustrating a preferred embodiment of the present invention.
Figure 6:
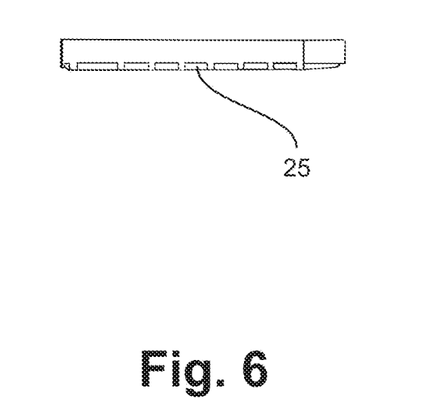
FIG. 6 is a front view illustrating a preferred embodiment of the present invention.
Figure 7:
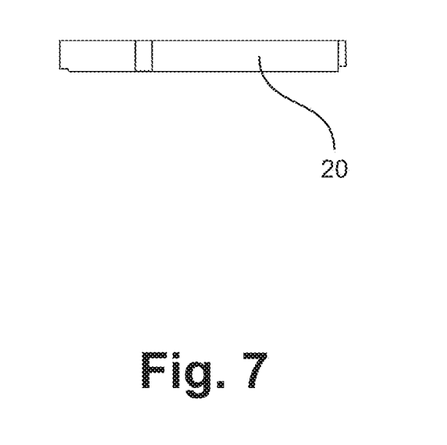
FIG. 7 is a back view illustrating a preferred embodiment of the present invention.
Figure 8:
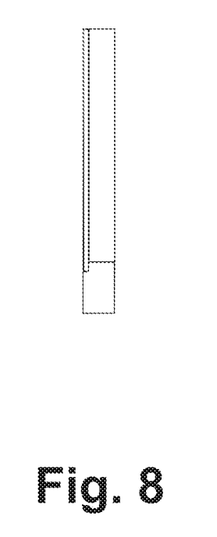
FIG. 8 is a left side view illustrating a preferred embodiment of the present invention.
Figure 9:
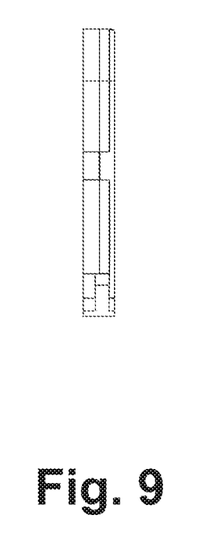
FIG. 9 is a right side view illustrating a preferred embodiment of the present invention.

FIG. 2 shows a preferred embodiment of the present invention with a latch 20 in a closed position. FIG. 3 shows a preferred embodiment of the present invention with the latch 20 in an open position. The back side 12 has a recessed portion 13, which can accommodate the latch 20 when the latch 20 is in the closed position. The latch 20 is connected to the housing 10 by a connector, such as a hinge 21 or a ball and socket joint, preferably located at one of the back corners of the memory card. In one preferred embodiment of the invention, a notch 22 is provided at an end of the latch 20 distal to the hinge 21. Using the notch 22 as a grip, a user can lift the latch 20 to the open position and then pull out the memory card using the latch 20, thereby allowing the user to readily remove the memory card from the reader without the use of tools or the use of a separate ejection mechanism. A gap 23 can be provided to allow easy access to the notch 22 or to another grip on the latch 20. While the preferred embodiment houses the memory card within the housing 10, the memory card, or a portion thereof, can also be housed within the latch 20.

Alternatives to the latch 20 can be used for different applications. For example, one skilled in the art will recognize that, for some applications, the hinge 21 may be better positioned on portions of the housing 10 other than the back corners of the memory card. In addition, the latch 20 is not restricted to opening outward from the back side 12, and can be designed to be opened in other directions, such as upward and away from the top of the memory card. It is also not necessary that the latch 20 be hinged to the housing 10. Other attachment mechanisms, such as handles or spring loaded latches are used in alternative embodiments of the present invention.

As previously discussed, some electronic devices are specifically designed to leave a portion of the memory card exposed outside of a shortened memory card reader. The exposed portion allows the memory card to be removed from the reader without an ejection mechanism. Because the latch 20 of the present invention allows the memory card to be removable even in the absence of an ejection mechanism, it is not necessary for any portion of the memory card to be exposed outside of the reader. Accordingly, the memory card can be truncated or modified to fit the shortened memory card reader. This allows the memory card to sit flush with the electronic device and avoids the issues related to unnecessary exposure of the memory card.

FIGS. 4 to 9 show various views of a preferred embodiment of the present invention. This preferred embodiment of the invention represents a memory card that conforms to the SD card format, with contact terminals 25 on the bottom of the memory card and aligned along the front side 11 of the housing 10. When inserted into a memory card reader, the contact terminals 25 align and communicate with the contact terminals of the reader.

Figure 10:
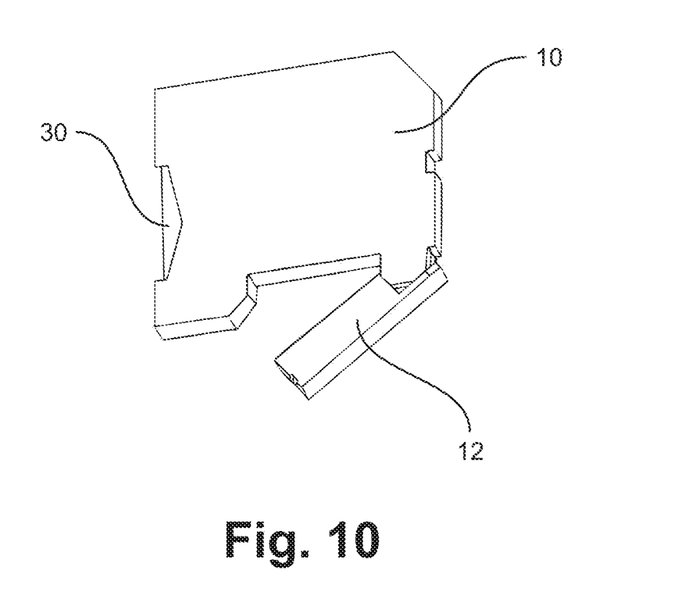
FIG. 10 is a perspective view illustrating a preferred embodiment of the memory card adapter according to the present invention.

FIG. 10 shows a memory card adapter according to the present invention. The memory card adapter can adapt a memory card, such as a microSD card, to fit a different memory card standard, such as an SD card. Preferably, the memory card will be of a smaller size and capable of being encased by the memory card adapter. The mini memory card (not shown) is inserted into the housing 10 through a mini memory card slot 30 located on one side of the memory card adapter. The memory card adapter, in turn, can be inserted into a memory card reader. Contact terminals of the mini memory card communicate with internal contact terminals inside the housing 10, which connect to external contact terminals located at the bottom of the housing 10. These external contact terminals are able to communicate with the contact terminals of the reader when they are properly aligned.

In embodiments of the adapter where the opening of the slot 30 generally faces the front, right, or left side, the opening is covered by the memory card reader and thus the mini memory card is held securely in place within the housing 10. In embodiments of the adapter with the opening of the slot 30 on the back side 12 or any side with a latch 20, the mini memory card can be secured by the latch 20 when the latch 20 is in the closed position.

Figure 11:
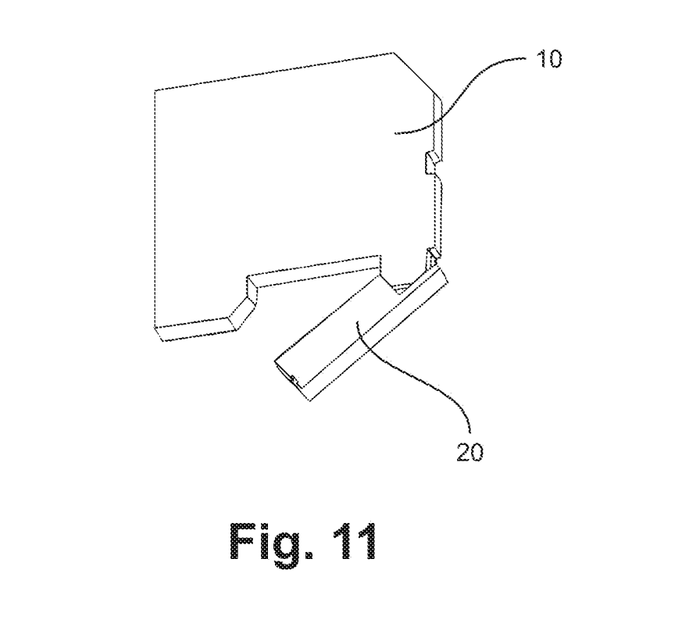
FIG. 11 is a perspective view illustrating a preferred embodiment of the wireless network interface controller according to the present invention.
Figure 12:
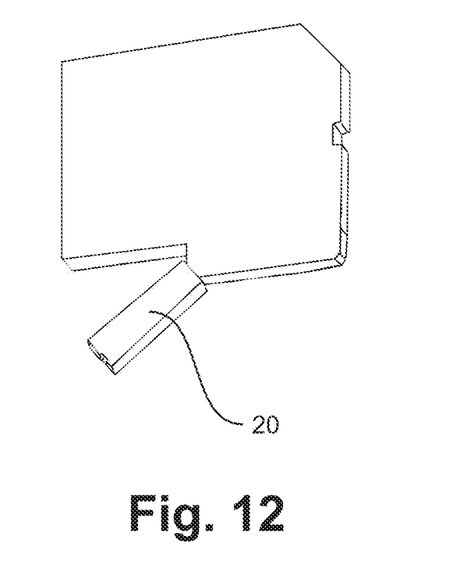
FIG. 12 is a perspective view illustrating a preferred embodiment of the present invention with a shortened latch.
Figure 13:
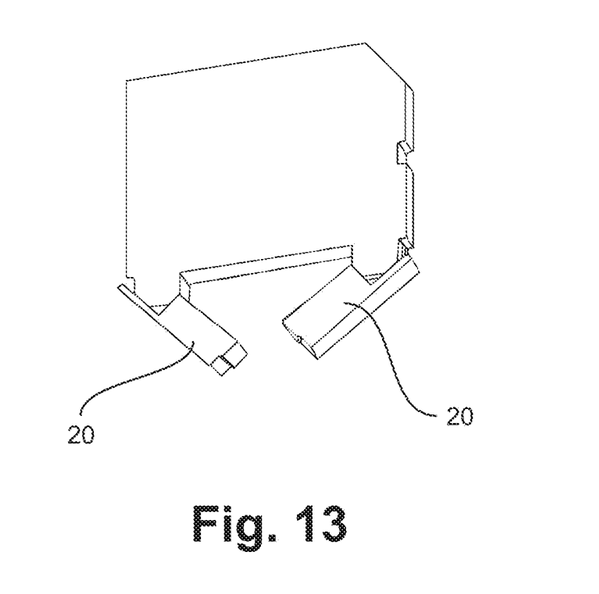
FIG. 13 is a perspective view illustrating a preferred embodiment of the present invention with two latches on one side.
Figure 14:
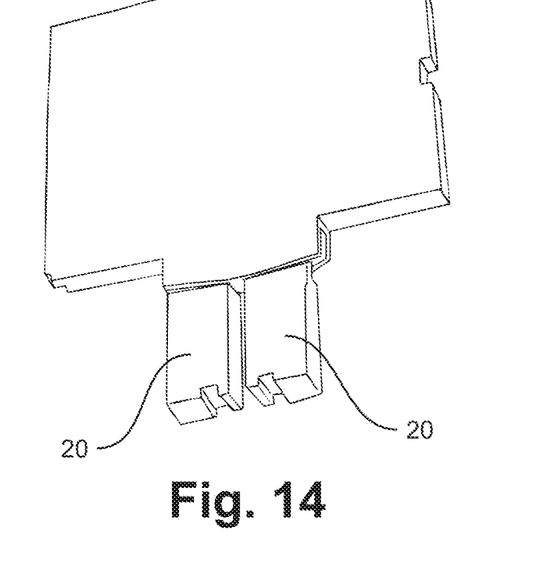
FIG. 14 is a perspective view illustrating a preferred embodiment of the present invention with two latches in an open position.
Figure 15:
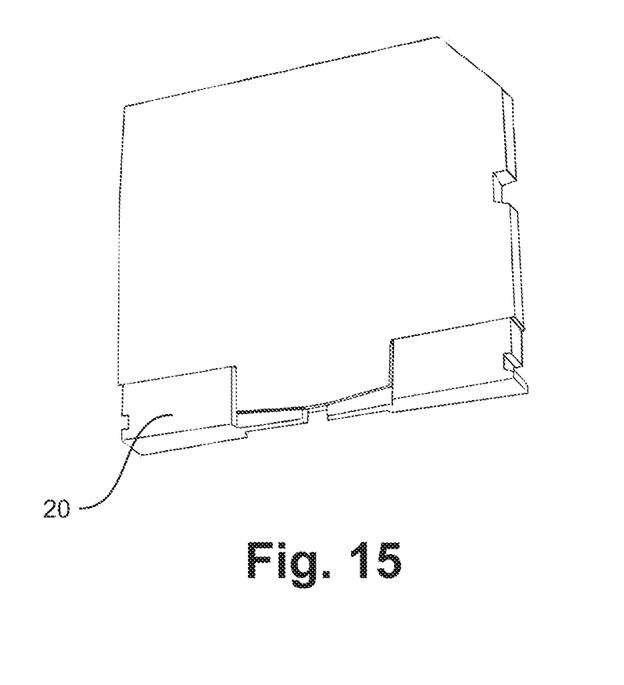
FIG. 15 is a perspective view illustrating a preferred embodiment of the present invention with two latches in a closed position.

FIG. 11 shows a wireless network interface controller (WNIC) according to the present invention. A WNIC is provided within the housing 10 and portions of the WNIC, such as the antenna, can be disposed within the latch 20.

FIGS. 12 to 15 show some of the additional preferred embodiments of the present invention. As discussed above, it may be useful for some applications to have a latch 20 or a plurality of latches 20 positioned on various positions on the memory card.

While the drawings depict preferred embodiments that conform to the SD card standard, one skilled in the art will recognize that the present invention can be adapted to other standards as well. In addition, while the foregoing is a description of the preferred embodiments carried out the invention, it will be understood that the invention is not limited to the particular embodiments shown and described herein, but that various changes and modifications may be made without departing from the scope or spirit of this invention as defined by the following claims.

LIST OF REFERENCE NUMERALS 10 housing
11 front side
12 back side
13 recessed portion
20 latch
21 hinge
22 notch
23 gap
25 contact terminals
30 mini memory card slot

What is claimed is:

1. A case capable of fitting into a memory card reader or a peripheral interface device, comprising:
   a housing having a plurality of sides, including a front side and a back side;
   a latch attached to the housing by a connector, the connector capable of moving the latch from a closed position to an open position;
   a recessed portion of the housing where the latch sits while in the closed position; and
   an external contact terminal provided near the front side, the external contact terminal capable of interacting with a contact terminal of the memory card reader or the peripheral interface device;
   wherein when the case is inserted into the memory card reader or the peripheral interface device, the back side sits generally flush with a side of the memory card reader or the peripheral interface device;
   wherein when the latch is in the closed position, the case substantially conforms to the dimensions of a memory card standard or a peripheral interface device standard; and
   wherein the memory card standard or a peripheral interface device standard is the Secure Digital standard.

2. A case capable of fitting into a memory card reader or a peripheral interface device, comprising:
   a housing having a plurality of sides, including a front side and a back side;
   a latch attached to the housing by a connector, the connector capable of moving the latch from a closed position to an open position;
   a recessed portion of the housing where the latch sits while in the closed position;
   an external contact terminal provided near the front side, the external contact terminal capable of interacting with a contact terminal of the memory card reader or the peripheral interface device;
   a mini memory card slot capable of receiving a mini memory card; and
   an internal contact terminal provided in the mini memory card slot, the internal contact terminal capable of interacting with a contact terminal of the mini memory card;
   wherein when the case is inserted into the memory card reader or the peripheral interface device, the back side sits generally flush with a side of the memory card reader or the peripheral interface device; and
   wherein the internal contact terminal connects to the external contact terminal, allowing communication between the mini memory card and the memory card reader or the peripheral interface device.

3. The case of claim 2, wherein an opening of the mini memory card slot faces a side of the case other than the back side.

4. The case of claim 3, wherein the connector is a hinge.

5. The case of claim 4, wherein the mini memory card slot is capable of receiving a microSD card.

6. The case of claim 2, wherein an opening of the mini memory card slot faces the back side and the latch covers the opening when the latch is in the closed position.

7. The case of claim 6, wherein the latch moves from the closed position to the open position by moving generally toward a backward direction.

8. The case of claim 6, wherein the latch moves from the closed position to the open position by moving generally toward an upward direction.

* * * * *